(12) United States Patent
Kino et al.

(10) Patent No.: US 7,080,619 B2
(45) Date of Patent: Jul. 25, 2006

(54) AIR INTAKE APPARATUS

(75) Inventors: Hitoshi Kino, Aichi (JP); Yoshikazu Hirose, Aichi (JP); Takahiro Komori, Aichi (JP); Tomoyuki Sawatari, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/801,860

(22) Filed: Mar. 17, 2004

(65) Prior Publication Data

US 2004/0226531 A1    Nov. 18, 2004

(30) Foreign Application Priority Data

Mar. 19, 2003   (JP)   ............................. P2003-074933

(51) Int. Cl.
*F02M 35/02*   (2006.01)
*F02M 35/10*   (2006.01)

(52) U.S. Cl. .................................. 123/184.57; 181/204
(58) Field of Classification Search ........... 123/184.57; 181/204

See application file for complete search history.

(56) References Cited

U.S. PATENT DOCUMENTS

| | | | | |
|---|---|---|---|---|
| 4,538,556 A | * | 9/1985 | Takeda | ................... 123/184.57 |
| 5,571,242 A | * | 11/1996 | Demorest | ............... 123/184.21 |
| 6,450,141 B1 | * | 9/2002 | Sakuma | .................. 123/184.57 |
| 6,553,953 B1 | * | 4/2003 | Fujihara et al. | ......... 123/184.21 |
| 6,622,680 B1 | * | 9/2003 | Kino et al. | ............. 123/184.21 |
| 6,792,907 B1 | * | 9/2004 | Kostun et al. | .......... 123/184.57 |
| 6,848,410 B1 | * | 2/2005 | Hoffmann et al. | ...... 123/184.57 |

FOREIGN PATENT DOCUMENTS

JP    A-2002-21660    1/2002

* cited by examiner

*Primary Examiner*—Marguerite McMahon
(74) *Attorney, Agent, or Firm*—Posz Law Group, PLC

(57) ABSTRACT

An air intake apparatus includes an air intake duct provided with an inlet through which intake air should be introduced, an air cleaner disposed on the downstream side of the air intake duct and for filtering the intake air, and an air cleaner hose disposed on the downstream side of the air cleaner and for supplying the filtered intake air to a combustion chamber of an engine, wherein an intake air passageway is laid out between the inlet and the combustion chamber. In a passageway wall surrounding an antinode of a lower resonance mode corresponding to the whole passageway length of the intake air passageway, a valve for opening a communicating path allowing the inside of the intake air passageway to communicate with the outside thereof at least when the lower resonance mode occurs, and an air-permeable member disposed to block the communicating path are disposed.

9 Claims, 8 Drawing Sheets

AIR INTAKE APPARATUS

The present application is based on Japanese Patent Application No. 2003-074933, which is incorporated herein by reference.

BACKGROUND OF THE INVENTION

1. Field of the Invention

The present invention relates to an air intake apparatus for supplying intake air to a combustion chamber of an engine.

2. Description of the Related Art

FIG. 7 shows a schematic view of an air intake apparatus. As shown in FIG. 7, an air intake apparatus 100 includes an air intake duct 101, a resonator 110, an air cleaner 103, an air cleaner hose 104, a throttle body 105 and an intake manifold 106. The intake air is taken into the air intake duct 101 through an inlet 102, and supplied to a combustion chamber 109 of an engine through the resonator 110, the air cleaner 103, the air cleaner hose 104, the throttle body 105 and the intake manifold 106.

Noise leaking from the inlet 102 (hereinafter referred to as "intake noise") becomes a problem in the air intake apparatus 100. The intake noise has a comparatively wide frequency band over 1 kHz. This frequency band is studded with a plurality of resonance peaks where the sound pressure level is conspicuously high. Therefore, the intake noise can be suppressed by reducing the resonance peaks.

For example, each resonance peak corresponds to a lower resonance mode corresponding to the tube length of the air intake duct 101, a lower resonance mode corresponding to the tube length of the air cleaner hose 104, or the like. Particularly a resonance peak in a comparatively low frequency band is generally called low-frequency booming noise. The low-frequency booming noise occurs in a comparatively low engine speed. The low-frequency booming noise is specially offensive to the ears of passengers in a vehicle cabin. Accordingly, to suppress the low-frequency booming noise is specially effective in silencing in the vehicle cabin. The low-frequency booming noise corresponds to the lower resonance mode corresponding to the whole length of the intake air passageway. Accordingly, in order to suppress the low-frequency booming noise, the pulsating pressure of the intake air in a portion where there is an antinode of the lower resonance mode corresponding to the whole length of the intake air passageway may be let out to the outside of the air intake apparatus.

Taking this point into consideration, Patent Document 1 discloses an air cleaner having an air-permeable member. FIG. 8 shows a schematic view of the air cleaner disclosed in the same document. Incidentally, portions similar to those in FIG. 7 are denoted by the same reference numerals correspondingly. As shown in FIG. 8, a part of a dirty-side bottom wall 111 of an air cleaner 103 is formed out of an air-permeable member 112. An antinode of a lower resonance mode corresponding to the whole length of an intake air passageway is located on the dirty side of the air cleaner 103. Thus, according to an air intake apparatus 100 disclosed in the same document, the pulsating pressure of the intake air can be let out from the inside of the air cleaner 103 to the outside thereof through the air-permeable member 112. It is therefore possible to suppress the low-frequency booming noise which is a low frequency component of the intake noise.

[Patent Document 1]
JP-2002-21660A

According to the air intake apparatus 100 disclosed in the same document, however, there is a fear that the noise increases instead due to the air-permeable member 112 in a comparatively high engine speed. That is, when the engine speed is high, there occurs no lower resonance mode corresponding to the whole length of the intake air passageway. In other words, when the engine speed is high, there occurs no low-frequency booming noise. It is therefore difficult to bring about the effect of suppressing the intake noise due to the air-permeable member 112.

In addition, noise having a resonance peak in another frequency band leaks from the inside of the air cleaner 103 to the outside thereof through the air-permeable member 112. In addition, there is also a fear that the air-permeable member 112 itself vibrates due to the pulsating pressure of the intake air, and serves as a source of noise. Thus, the noise leaking to the outside of the air intake apparatus 100 through the air-permeable member 112 (hereinafter referred to as "transmitted noise") increases instead. In such a manner, according to the air intake apparatus 100 disclosed in the same document, there is a fear that the noise increases with the increase of the transmitted noise when the engine speed is comparatively high.

SUMMARY OF THE INVENTION

An air intake apparatus according to the invention has been developed in consideration of the foregoing problems. An object of the invention is to provide an air intake apparatus in which a high noise suppressing effect can be secured regardless of the existence of occurrence of a lower resonance mode corresponding to the whole length of an intake air passageway.

(1) In order to solve the foregoing object, according to the invention, there is provided an air intake apparatus having an air intake duct provided with an inlet through which intake air should be introduced, an air cleaner disposed on the downstream side of the air intake duct and for filtering the intake air, and an air cleaner hose disposed on the downstream side of the air cleaner and for supplying the filtered intake air to a combustion chamber of an engine, wherein: an intake air passageway is laid out between the inlet and the combustion chamber; and an air-permeable member disposed to block a communicating path, and a valve for opening the communicating path allowing the inside of the intake air passageway to communicate with the outside thereof at least when there occurs the lower resonance mode corresponding to the whole passageway length of the intake air passageway are disposed in a passageway wall surrounding an antinode of the lower resonance mode.

The communicating path for allowing the inside of the intake air passageway to communicate with the outside thereof is provided in the passageway wall of the air intake apparatus according to the invention. The communicating path is disposed in the passageway wall surrounding the antinode of the lower resonance mode corresponding to the whole passageway length of the intake air passageway. The communicating path is blocked by the air-permeable member. That is, the inside and the outside of the intake air passageway communicate with each other through the air-permeable member. In addition, the valve for opening and closing the communicating path is disposed in the passageway wall. The valve opens the communicating path at least when the lower resonance mode corresponding to the whole passageway length of the intake air passageway occurs.

In the air intake apparatus according to the invention, the valve opens the communicating path at least when there occurs a lower resonance mode corresponding to the whole passageway length of the intake air passageway. Accordingly, the pulsating pressure of the intake air can be let out to the outside of the air intake apparatus through the air-permeable member. It is therefore possible to suppress low-frequency booming noise, of frequency components of intake noise.

On the contrary, when there occurs no lower resonance mode corresponding to the whole passageway length of the intake air passageway, the valve can close the communicating path. Thus, transmitted noise of any resonance mode other than the lower resonance mode corresponding to the whole passageway length of the intake air passageway can be prevented from leaking to the outside of the air intake apparatus through the air-permeable member.

In such a manner, according to the air intake apparatus of the invention, a high noise suppressing effect can be secured regardless of the existence of occurrence of the lower resonance mode corresponding to the whole length of the intake air passageway.

Here, the intake air passageway means a passageway section which ranges from the inlet to the upstream end of the combustion chamber and in which the intake air should flow. In addition, the lower resonance mode means a primary or secondary resonance mode when the intake air passageway is regarded as a line.

(2) Preferably, the air intake apparatus may be adapted so that the air cleaner includes a casing, and an element for dividing the inside of the casing into a dirty side and a clean side, and the valve and the air-permeable member are disposed in the casing.

That is, in this configuration, the valve and the air-permeable member are disposed in the casing of the air cleaner. According to this configuration, a high noise suppressing effect can be secured when the antinode of the lower resonance mode corresponding to the whole passageway length of the intake air passageway exists inside the air cleaner.

(3) Preferably, the air intake apparatus may be adapted so that the valve opens the communicating path at least when an engine speed is not higher than an upper limit value of an engine speed range where the lower resonance mode corresponding to the whole passageway length of the intake air passageway occurs. In this configuration, taking into consideration the relation between the occurrence of low-frequency booming noise and the engine speed, the communicating path is opened and closed with the engine speed being used as an index. In this configuration, for example, when low-frequency booming noise occurs in the condition that the engine speed is in a predetermined range of not higher than 2,500 rpm, the communicating path is controlled to be opened and closed with the engine speed of 2,500 rpm being used as a threshold. The engine speed can be detected comparatively easily, for example, based on an existing crank sensor, an existing cam sensor, intake air negative pressure, intake air flow velocity, or the like. Thus, according to this configuration, the communicating path can be controlled to be opened and closed comparatively easily.

(4) Preferably, the air intake apparatus may be adapted to further include a sound insulation chamber provided on the downstream side of the air-permeable member in the communicating path and for attenuating transmitted noise passing through the air-permeable member. According to this configuration, the transmitted noise passing through the air-permeable member repeats reflection in the sound insulation chamber, and then is released to the outside of the air intake apparatus. Due to the reflection, the energy of the transmitted noise is reduced. That is, the transmitted noise is attenuated. Thus, according to this configuration, the transmitted noise suppressing effect is enhanced.

DETAILED DESCRIPTION OF THE PREFERRED EMBODIMENTS

Embodiments of an air intake apparatus according to the invention will be described below.

(1) First Embodiment

Figure 1:
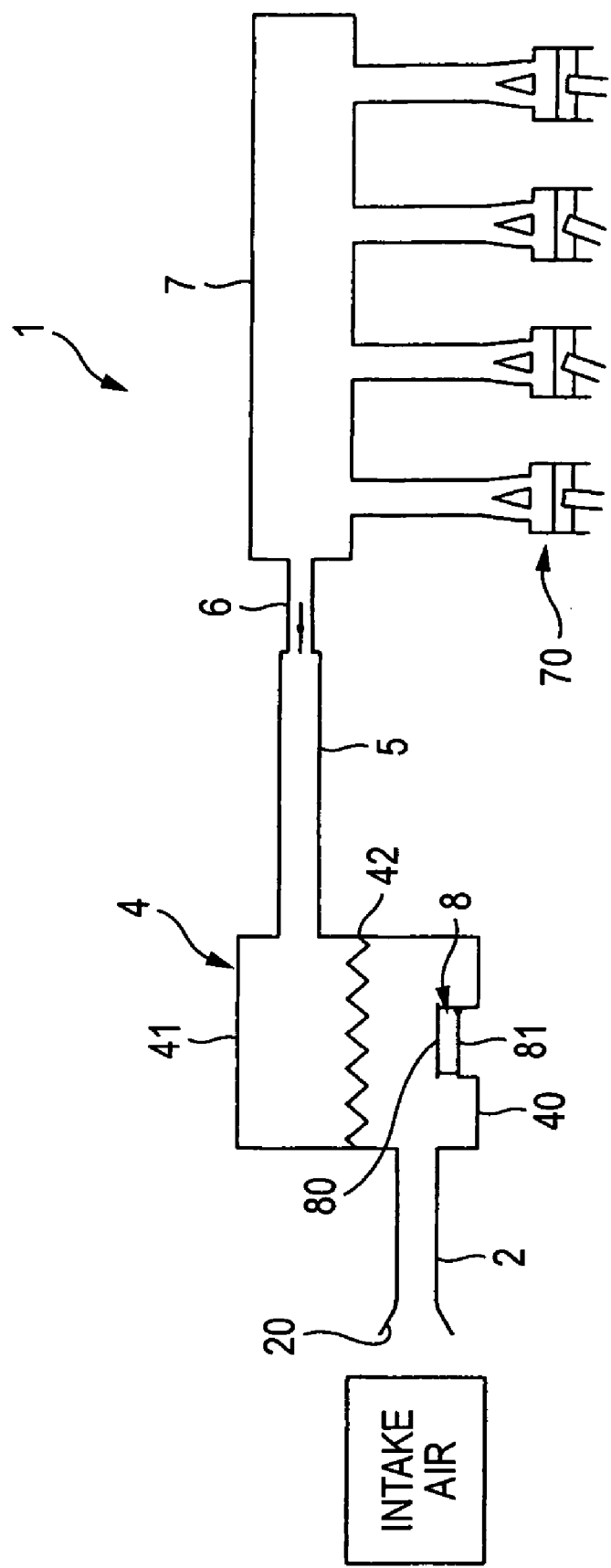
FIG. 1 is a schematic view of an air intake apparatus according to a first embodiment of the invention.

First, description will be made on the configuration of an air intake apparatus according to this embodiment. FIG. 1 shows a schematic view of the air intake apparatus according to this embodiment. As shown in FIG. 1, an air intake apparatus 1 includes an air intake duct 2, an air cleaner 4, an air cleaner hose 5, a throttle body 6 and an intake manifold 7.

The air intake duct 2 is made from PP (polypropylene) and has a cylindrical shape. The air intake duct 2 communicates with the outside of a car through an inlet 20 provided at the upstream end of the air intake duct 2.

Figure 2:
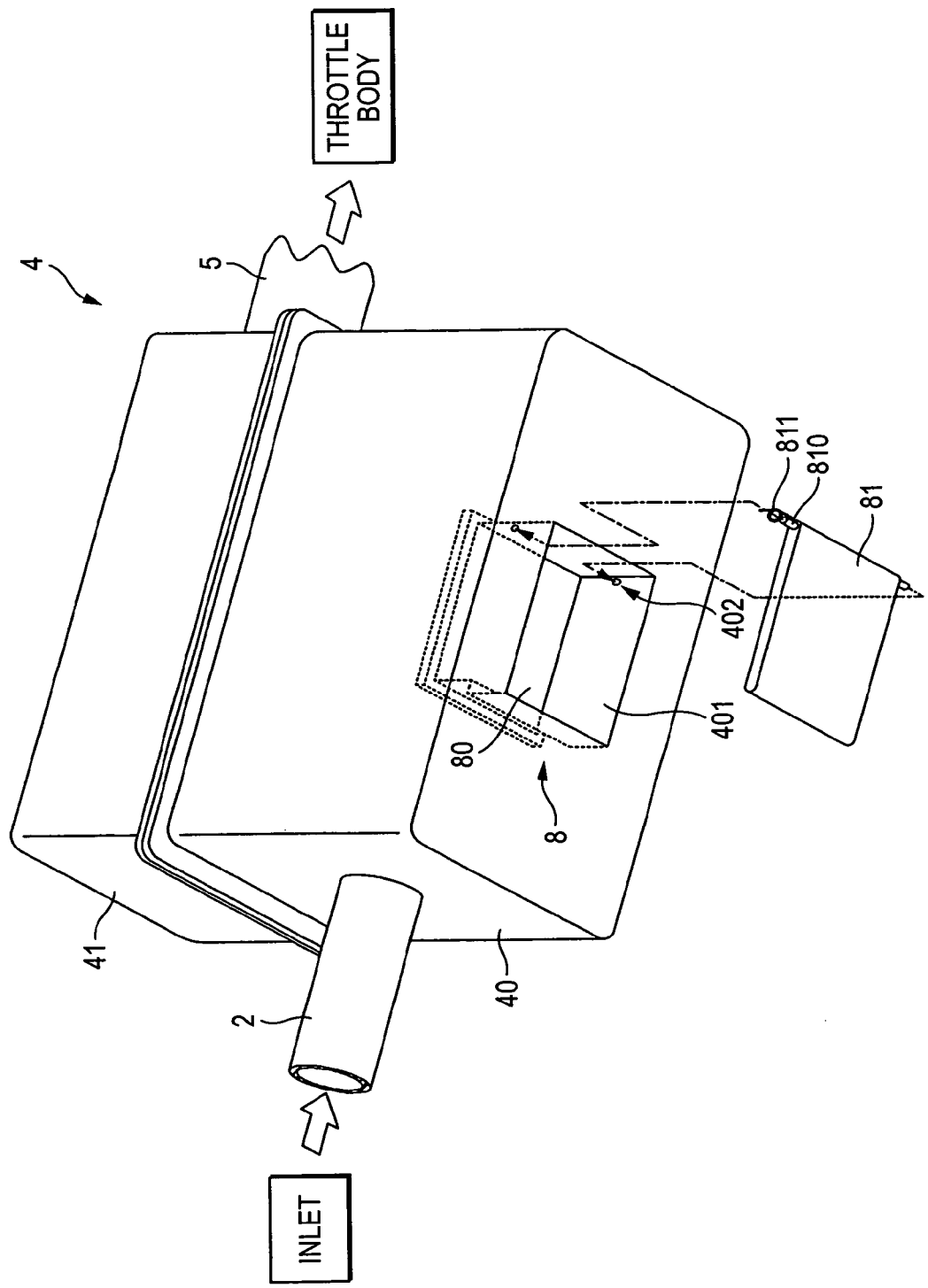
FIG. 2 is a perspective view of an air cleaner of the air intake apparatus according to the first embodiment.
Figure 3:
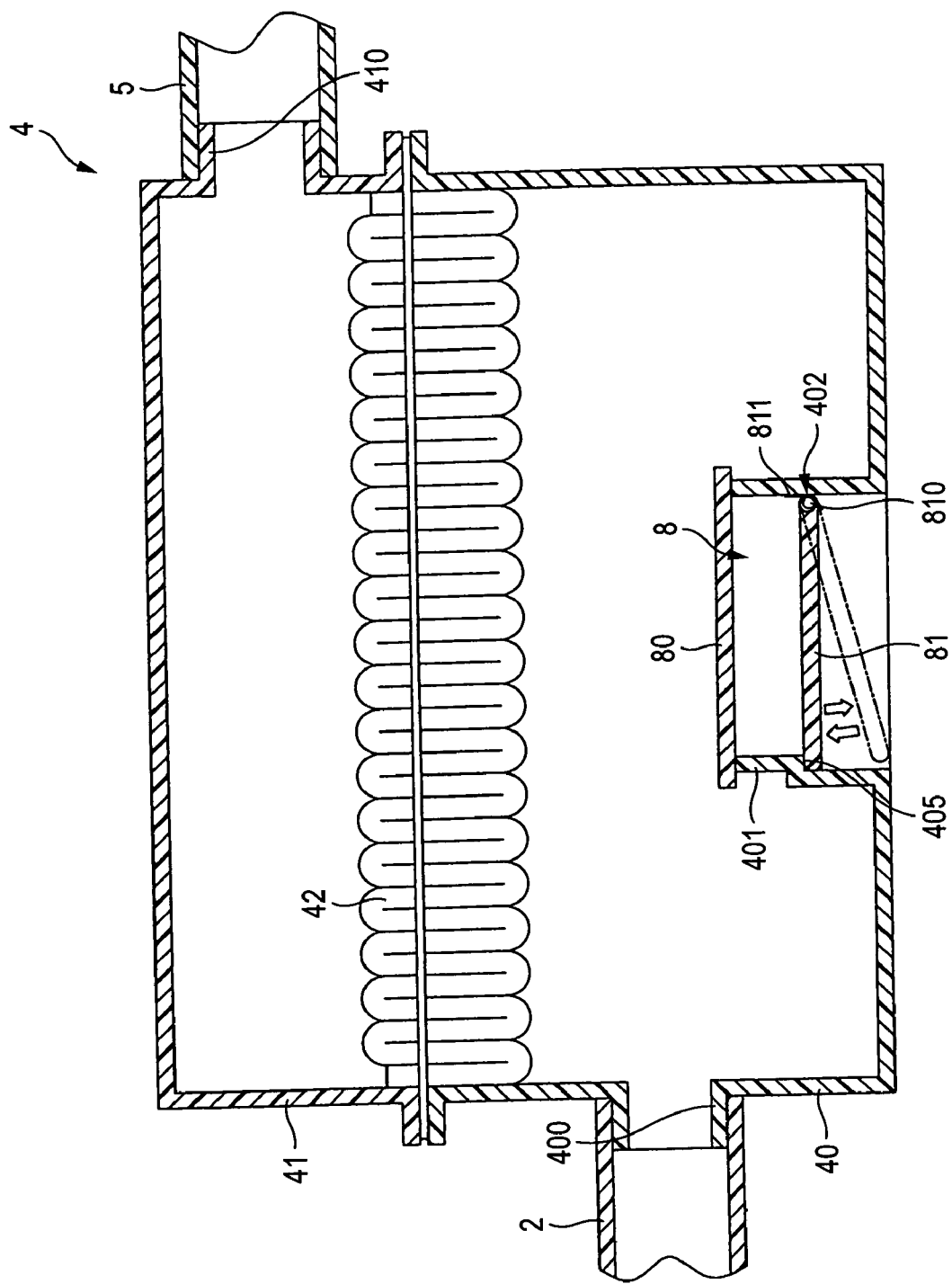
FIG. 3 It is a longitudinally sectional view of the air cleaner of the air intake apparatus according to the first embodiment.

The air cleaner 4 has a dirty-side split casing 40, a clean-side split casing 41 and an element 42. The casing according to the invention is constituted by the dirty-side split casing 40 and the clean-side split casing 41. FIG. 2 shows a perspective view of the air cleaner of the air intake apparatus according to this embodiment. In addition, FIG. 3 shows a longitudinally sectional view of the air cleaner of the air intake apparatus according to this embodiment.

As shown in these drawings, the dirty-side split casing 40 is made from PP filled with talc or the like, or PP filled with glass fiber or the like, and has a box-like shape open at the top. An antinode of the lower resonance mode corresponding to the whole passageway length (ranging from the inlet 20 to the upstream end of a combustion chamber 70) of the intake air passageway exists inside the dirty-side split casing 40. A duct connecting cylinder 400 is provided to project over a side wall of the dirty-side split casing 40. The duct connecting cylinder 400 is connected to the downstream end of the air intake duct 2. In addition, a ring rib 401 is provided to project upward substantially from the center of the bottom wall of the dirty-side split casing 40. The ring rib 401 has a shape like a square cup. A step-like stopper 405 is formed in a wall of the ring rib 401. A communicating path 8 is laid out on the inner circumferential side of the ring rib 401. The communicating path 8 makes the inside of the dirty-side split casing 40 communicate with the outside thereof. An air-permeable member 80 made from PET non-woven fabric and having a rectangular plate-like shape is welded-onto the front end surface of the ring rib 401. The upper end of the communicating path 8 is blocked by the air-permeable member 80. Two valve mounting holes 402 in total are provided in end portions of opposite two of the four walls forming the ring rib 401. A valve 81 is made of PP filled with talc or the like or PP filled with glass fiber or the like, and has a rectangular plate-like shape. Two rotating shafts 810 in total are provided to project from end portions of a pair of opposite plate-thickness surfaces of the valve 81. The rotating shafts 810 are rotatably supported in the valve mounting holes 402 through springs 811 respectively. That is, the valve 81 can rotate around the rotating shafts 810. In addition, the valve 81 is urged by the springs 811 so as to open the communicating path 8. Due to the stopper 405, the rotation angle of the valve 81 is regulated between the position where the valve 81 will close the communicating path 8 as shown by the solid line in FIG. 3 and the position where the valve 81 will open the communicating path 8 as shown by the chain line in FIG. 3.

The clean-side split casing 41 is made of PP filled with talc or the like or PP filled with glass fiber or the like, and has a box-like shape open at the bottom. The clean-side split casing 41 is disposed above the dirty-side split casing 40 so that the opening of the clean-side split casing 41 is turned down. A hose connecting cylinder 410 is provided to project from a side wall of the clean-side split casing 41.

The element 42 has a rectangular plate-like shape gusseted out of PET non-woven fabric. The element 42 is fixedly retained between the opening edge of the dirty-side split casing 40 and the opening edge of the clean-side split casing 41. By the element 42, the closed space formed by the dirty-side split casing 40 and the clean-side split casing 41 is divided into two, upper and lower chambers.

With reference to FIG. 1 again, the air cleaner hose 5 is made from CR (chloroprene rubber) and has a bellows-like shape. The upstream end of the air cleaner hose 5 is connected to the hose connecting cylinder 410 shown in FIG. 3. The upstream end of the cylindrical throttle body 6 is connected to the downstream end of the air cleaner hose 5. The intake manifold 7 divergently connected to the combustion chamber 70 is connected to the downstream end of the throttle body 6. In the air intake apparatus 1, the air taken into the inlet 20 from the outside passes through the air intake duct 2, the dirty-side split casing 40, the element 42, the clean-side split casing 41, the air cleaner hose 5, the throttle body 6 and the intake manifold 7 in that order, and flows into the combustion chamber 70.

Next, description will be made on the behavior of the valve of the air intake apparatus according to this embodiment. When the engine speed is not higher than 2,500 rpm, there occurs a lower resonance mode corresponding to the whole passageway length of the intake air passageway. That is, in the air intake apparatus according to this embodiment, the engine speed of 2,500 rpm corresponds to the "upper limit value of the engine speed range where the lower resonance mode corresponding to the whole passageway length of the intake air passageway occurs" according to the invention. The valve 81 opens the communicating path 8 due to the urging force of the springs 811 as shown by the chain line in FIG. 3. Accordingly, the air in the dirty-side split casing 40 is released as transmitted noise to the outside through the air-permeable member 80. In this event, the energy of the transmitted noise is reduced on a large scale due to the flow resistance caused by the viscosity. That is, the transmitted noise whose energy has been reduced so that the sound pressure has been reduced leaks out from the communicating path 8. On the other hand, intake noise leaks out from the inlet 20. The sound pressure of the intake noise is also reduced in accordance with the leakage of the transmitted noise. Specifically, of frequency components of the intake noise, low-frequency booming noise is reduced.

When the engine speed exceeds 2,500 rpm, there occurs no lower resonance mode corresponding to the whole passageway length of the intake air passageway. In addition, when the engine speed exceeds 2,500 rpm, the intake air negative pressure increases relatively. As a result, the valve 81 is sucked against the urging force of the springs 811 due to the intake air negative pressure, so that the valve 81 rotates clockwise as shown by the outline arrow in FIG. 3. Thus, the valve 81 abuts against the stopper 405 so as to close the communicating path 8. Since the communicating path 8 is closed, the transmitted noise is reduced.

Next, description will be made on the effect of the air intake apparatus according to this embodiment. In the air intake apparatus 1 according to this embodiment, the communicating path 8 is laid out in the dirty-side split casing 40. Therefore, dust invading the dirty-side split casing 40 through the communicating path 8 can be filtered by the element 42. Thus, cleanliness can be secured in the intake air passageway on the downstream side of the element 42.

In addition, in the air intake apparatus 1 according to this embodiment, when the engine speed is not higher than 2,500 rpm, the valve 81 opens the communicating path 8. Thus, low-frequency booming noise can be suppressed. On the contrary, when the engine speed exceeds 2,500 rpm, the valve 81 closes the communicating path 8. Thus, transmitted noise can be prevented from leaking to the outside of the air intake apparatus 1. That is, in the air intake apparatus 1 according to this embodiment, a high noise suppressing effect can be secured regardless of the existence of occurrence of low-frequency booming noise.

In addition, in the air intake apparatus 1 according to the this embodiment, taking into consideration the relation between the occurrence of low-frequency booming noise and the engine speed, the communicating path 8 is opened and closed with the engine speed being used as an index. Thus, the communicating path 8 can be controlled to be opened and closed comparatively easily.

Further, the valve 81 of the air intake apparatus 1 according to this embodiment is automatically actuated by the intake air negative pressure with the engine speed of 2,500 rpm being used as a threshold. Accordingly, the structure is simple, for example, in comparison with the structure where the engine speed is electrically detected based on a crank sensor or a cam sensor so as to actuate an electromagnetic valve. That is, the valve 81 of the air intake apparatus 1 according to this embodiment also has a function of a sensor and a function of an actuator. In addition, a controller for controlling the valve 81 is dispensable. However, the valve 81 may be opened and closed in accordance with the engine speed by an electromagnetic actuator or the like.

(2) Second Embodiment

This embodiment is different from the first embodiment in that the valve is disposed on the upstream side of the air-permeable member in the communicating path. Therefore, only the difference will be described here.

Figure 4:
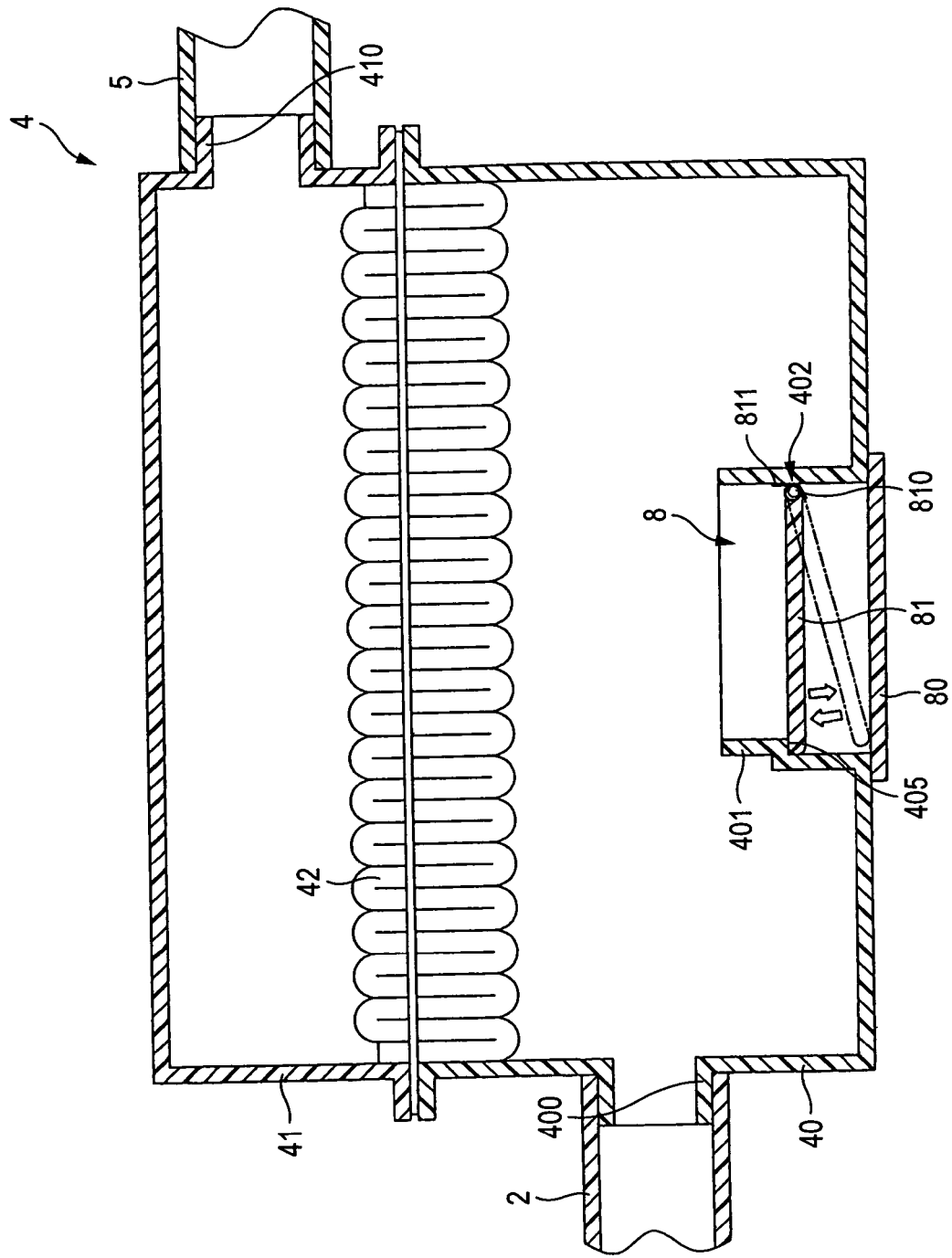
FIG. 4 is a longitudinally sectional view of an air cleaner of an air intake apparatus according to a second embodiment of the invention.

FIG. 4 shows a longitudinally sectional view of an air cleaner of an air intake apparatus according to this embodiment. Incidentally, portions similar to those in FIG. 3 are denoted by the same reference numerals correspondingly. As shown in FIG. 4, the air-permeable member 80 is welded onto the external surface of the bottom wall of the dirty-side split casing 40 in which the communicating path 8 is laid out. That is, the air-permeable member 80 blocks the lower end of the communicating path 8. The valve 81 is disposed on the upstream side of the air-permeable member 80.

Description will be made on the behavior of the valve of the air intake apparatus according to this embodiment. When the engine speed is not higher than 2,500 rpm, there occurs a lower resonance mode corresponding to the whole passageway length of the intake air passageway. The valve 81 opens the communicating path 8 due to the urging force of the springs 811 as shown by the chain line in FIG. 4. Accordingly, the air in the dirty-side split casing 40 is released as transmitted noise to the outside through the air-permeable member 80. In this event, the energy of the transmitted noise is reduced on a large scale due to the flow resistance caused by the viscosity. That is, the transmitted noise whose energy has been reduced so that the sound pressure has been reduced leaks out from the communicating path 8. On the other hand, intake noise leaks out from the inlet. The sound pressure of the intake noise is also reduced in accordance with the leakage of the transmitted noise. Specifically, of frequency components of the intake noise, low-frequency booming noise is reduced.

When the engine speed exceeds 2,500 rpm, there occurs no lower resonance mode corresponding to the whole passageway length of the intake air passageway. In addition, when the engine speed exceeds 2,500 rpm, the intake air negative pressure increases relatively. As a result, the valve 81 is sucked against the urging force of the springs 811 due to the intake air negative pressure, so that the valve 81 rotates clockwise as shown by the outline arrow in FIG. 4. Thus, the valve 81 abuts against the stopper 405 so as to close the communicating path 8. Since the communicating path 8 is closed, the transmitted noise is reduced. The air intake apparatus 1 according to this embodiment has an effect similar to that of the air intake apparatus according to the first embodiment. In addition, in the air intake apparatus 1 according to this embodiment, the valve 81 is received in the air cleaner 4. That is, the valve 81 is isolated from the outside by the air-permeable member 80. Accordingly, the fear that the valve 81 interferes with a member disposed externally is reduced. In addition, dust from the outside is filtered by the air-permeable member 80. Thus, the cleanliness of the valve 81 can be secured. In addition, in the air intake apparatus 1 according to this embodiment, the air-permeable member 80 is disposed at the downstream end of the communicating path 8. Accordingly, the air-permeable member 80 can be maintained and exchanged easily. In addition, clogging, fouling, etc. in the air-permeable member 80 can be recognized visually.

(3) Third Embodiment

This embodiment is different from the second embodiment in that the sound insulation chamber is laid out on the downstream side of the air-permeable member in the communicating path. Therefore, only the difference will be described here.

Figure 5:
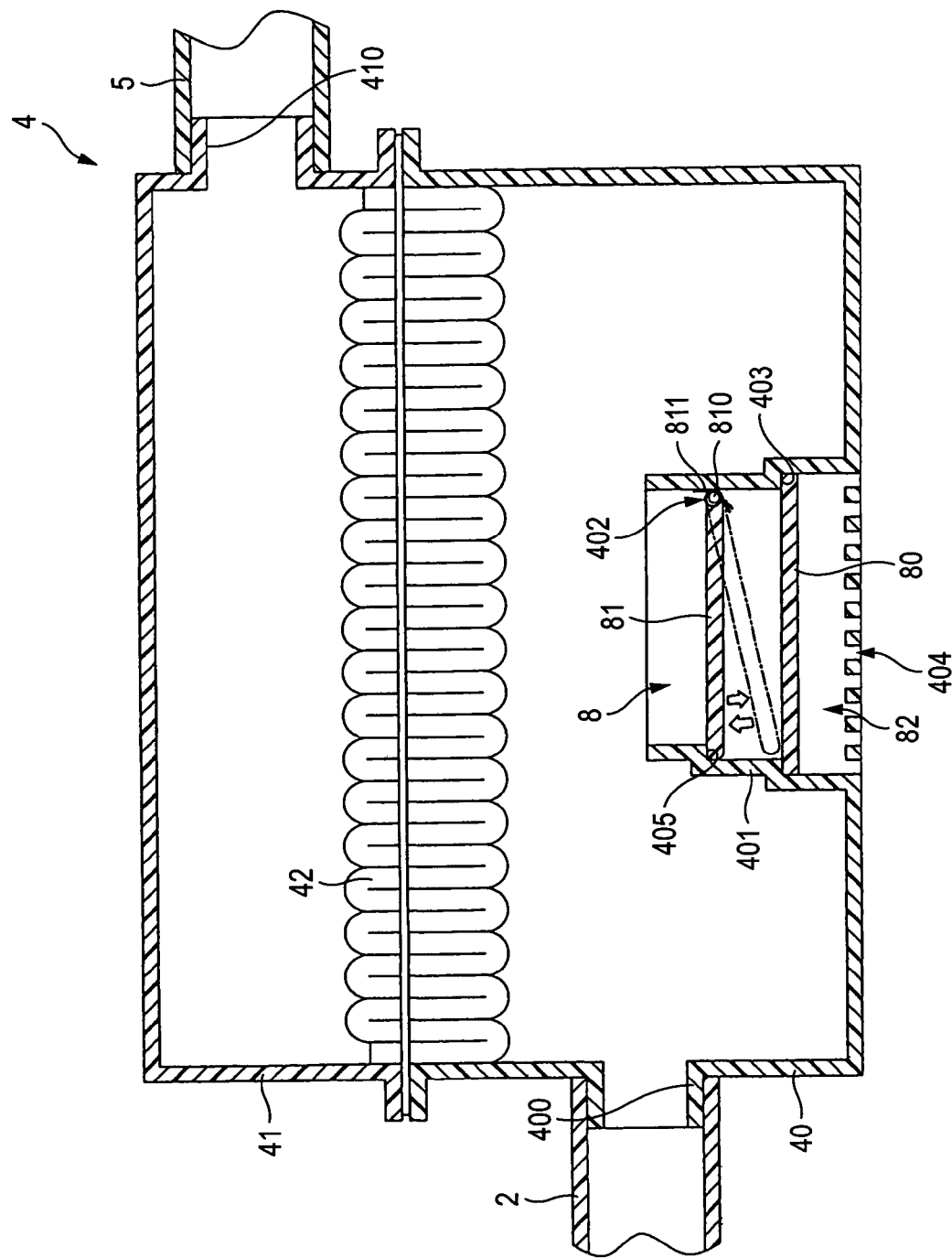
FIG. 5 is a longitudinally sectional view of an air cleaner of an air intake apparatus according to a third embodiment of the invention.

FIG. 5 shows a longitudinally sectional view of an air cleaner of an air intake apparatus according to this embodiment. Incidentally, portions similar to those in FIG. 4 are denoted by the same reference numerals correspondingly. As shown in FIG. 5, the ring rib 401 has a stepped square-cup-like shape getting smaller as approaching the top. The circumferential edge of the air-permeable member 80 is welded onto the surface of a step portion 403 of the ring rib 401. The valve 81 is disposed on the upstream side of the air-permeable member 80. On the other hand, a sound insulation chamber 82 is laid out on the downstream side of the air-permeable member 80. That is, the air-permeable member 80 blocks the communicating path 8. The sound insulation chamber 82 is defined by the inner surface of the ring rib 401, the lower surface of the air-permeable member 80, and the upper surface of the lower wall of the dirty-side split casing 40 where a large number of through holes 404 are provided.

Description will be made on the behavior of the valve of the air intake apparatus according to this embodiment. When the engine speed is not higher than 2,500 rpm, there occurs a lower resonance mode corresponding to the whole passageway length of the intake air passageway. The valve 81 opens the communicating path 8 due to the urging force of the springs 811 as shown by the chain line in FIG. 5. Accordingly, the air in the dirty-side split casing 40 is released as transmitted noise to the outside through the air-permeable member 80 and the sound insulation chamber 82. When the transmitted noise passes through the air-permeable member 80, the energy of the transmitted noise is reduced on a large scale due to the flow resistance caused by the viscosity. In addition, the transmitted noise which has passed through the air-permeable member 80 is reflected repeatedly on the inner surface of the ring rib 401, the lower surface of the air-permeable member 80 or the upper surface of the lower wall of the dirty-side split casing 40, which surfaces define the sound insulation chamber 82. Due to this reflection, the energy of the transmitted noise is further reduced. The transmitted noise whose energy has been reduced leaks out to the outside through the through holes 404. On the other hand, intake noise leaks out from the inlet. The sound pressure of the intake noise is also reduced in accordance with the leakage of the transmitted noise. Specifically, of frequency components of the intake noise, low-frequency booming noise is reduced.

When the engine speed exceeds 2,500 rpm, there occurs no lower resonance mode corresponding to the whole passageway length of the intake air passageway. In addition, when the engine speed exceeds 2,500 rpm, the intake air negative pressure increases relatively. As a result, the valve 81 is sucked against the urging force of the springs 811 due to the intake air negative pressure, so that the valve 81 rotates clockwise as shown by the outline arrow in FIG. 5. Thus, the valve 81 abuts against the stopper 405 so as to close the communicating path 8. Since the communicating path 8 is closed, the transmitted noise is reduced. The air intake apparatus 1 according to this embodiment has an effect similar to that of the air intake apparatus according to the first embodiment. In addition, in the air intake apparatus 1 according to this embodiment, the sound insulation chamber 82 is laid out. Accordingly, when the engine speed is not higher than 2,500 rpm, the transmitted noise is reduced not only by the air-permeable member 80 but also by the sound insulation chamber 82. Thus, the transmitted noise can be reduced particularly when the engine speed is not higher than 2,500 rpm.

Description was made above on the embodiments of the air intake apparatus according to the invention. However, the mode for carrying out the invention is not limited to the embodiments. Various modifications or improvements can be made on the invention by those skilled in the art.

For example, the air-permeable member 80 was disposed only in the air cleaner 4 in the embodiments. However, another air-permeable member 80 may be disposed in the air intake duct 2 or the air cleaner hose 5 separately so as to be used in combination with the air cleaner 4 according to any one of the embodiments. With such a configuration, it is possible to suppress not only a low-frequency intake noise component corresponding to the lower resonance mode corresponding to the whole passageway length of the intake air passageway but also an intake noise component corresponding to a resonance mode corresponding to the tube length of the air intake duct 2, a resonance mode corresponding to the tube length of the air cleaner hose 5, or the like.

When the antinode of the lower resonance mode corresponding to the whole length of the passageway is in a member other than the dirty-side split casing 40, the communicating path 8 may be provided in that member with the air-permeable member 80, the valve 81 and so on being disposed correspondingly.

In the embodiments, the dirty-side split casing 40 and the clean-side split casing 41 were formed out of talc-filled PP. However, the material of the dirty-side split casing 40 and the clean-side split casing 41 is not limited especially. For example, they may be formed out of PP filled with talc and glass fiber.

In the embodiments, the air-permeable member 80 was formed out of PET non-woven fabric. However, the material of the air-permeable member 80 is not limited especially. For example, the air-permeable member 80 may be formed out of PP non-woven fabric or PA (polyamide) non-woven fabric. The material is not limited to non-woven fabric. The air-permeable member 80 may be formed out of PET woven fabric, PP woven fabric, PA woven fabric, or cotton. Alternatively, the air-permeable member 80 may be formed out of urethane based open-cell sponge or EPDM (ethylene-propylene-diene monomer) based open-cell sponge. Alternatively, filter paper may be used.

In the embodiments, the air cleaner hose 5 was formed out of CR. However, the material of the air cleaner hose 5 is not limited especially. For example, the air cleaner hose 5 may be formed out of a blended material of NBR (acrylonitrile-butadiene rubber) and PVC (polyvinyl chloride), EPDM, a blended material of NBR and EPDM, or Santoprene elastomer.

In the embodiments, the air intake duct 2 was formed out of PP. However, for example, it may be formed out of PE (polyethylene) or the like.

The method for bonding the air-permeable member 80 and the dirty-side split casing 40 is not limited especially. For example, they may be bonded by a welding method using hot plate welding, vibration welding, ultrasonic welding or the like. Alternatively, they may be bonded by an adhesive agent. When the dirty-side split casing 40 is produced by injection molding, the air-permeable member 80 may be bonded by insert molding at the time of the injection molding.

In the embodiments, the communicating path 8 was opened all over the range where the engine speed was not higher than 2,500 rpm. However, when the range where the engine speed is not high than 2,500 rpm includes a region where there occurs no lower resonance mode corresponding to the whole passageway length of the intake air passageway, the communicating path 8 may be closed only in such a region. In other words, the communicating path 8 may be opened by the valve 81 only in a pinpoint engine speed region where there occurs a lower resonance mode corresponding to the whole passageway length of the intake air passageway. With such a configuration, the transmitted noise suppressing effect is enhanced in the engine speed region where there occurs no lower resonance mode corresponding to the whole passageway length of the intake air passageway.

EXAMPLE

With reference to FIG. 1 again, description will be made below on experiments performed using the air intake apparatus according to the first embodiment. The air intake apparatus 1 according to the first embodiment is used as Example. In addition, an air intake apparatus in which only the air-permeable member 80 is disposed while the valve 81 is not disposed—is used as Comparative Example.

Figure 6:
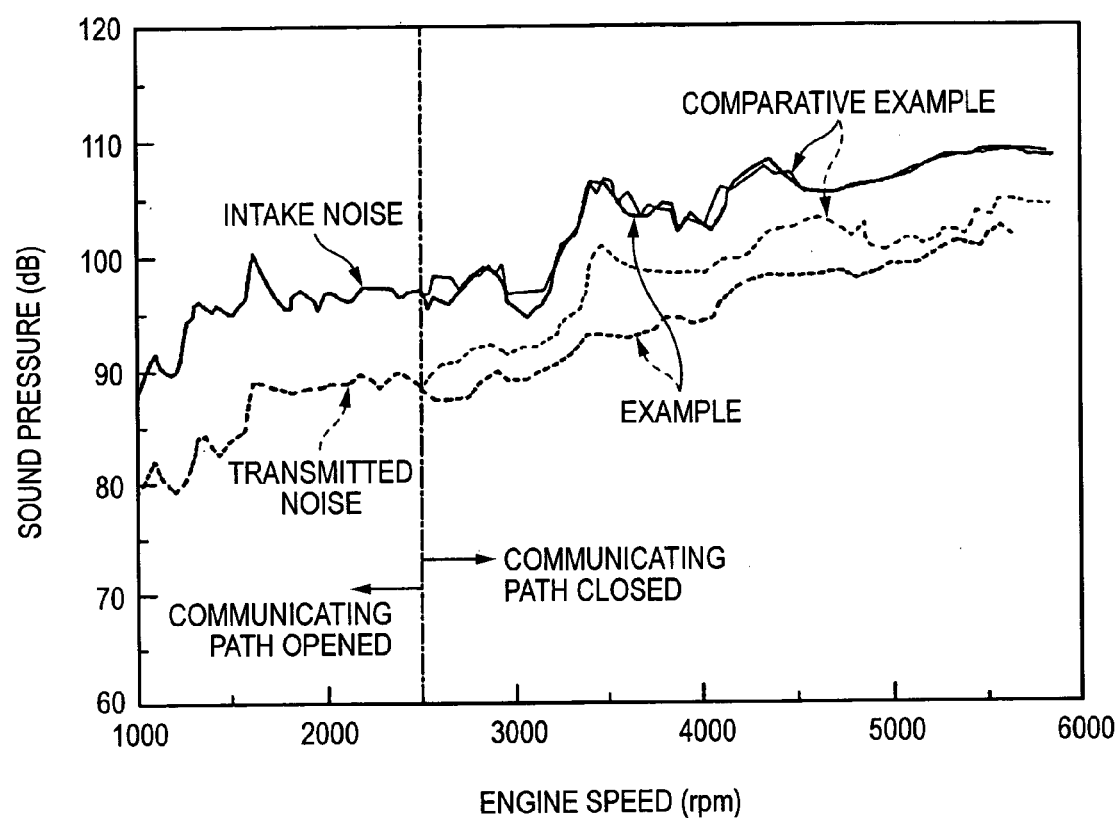
FIG. 6 is a graph showing the relation among the engine speed, the intake noise and the transmitted noise in Example and Comparative Example.
Figure 7:
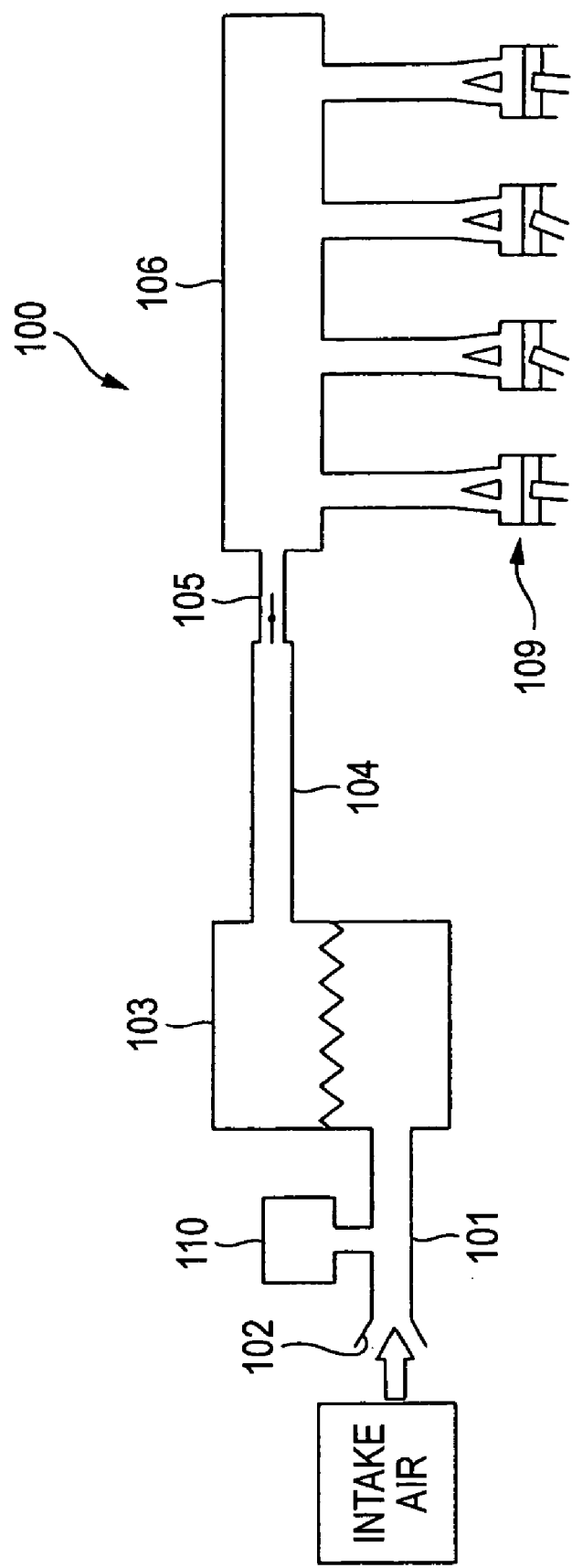
FIG. 7 is a schematic view of an air intake apparatus in the related art.
Figure 8:
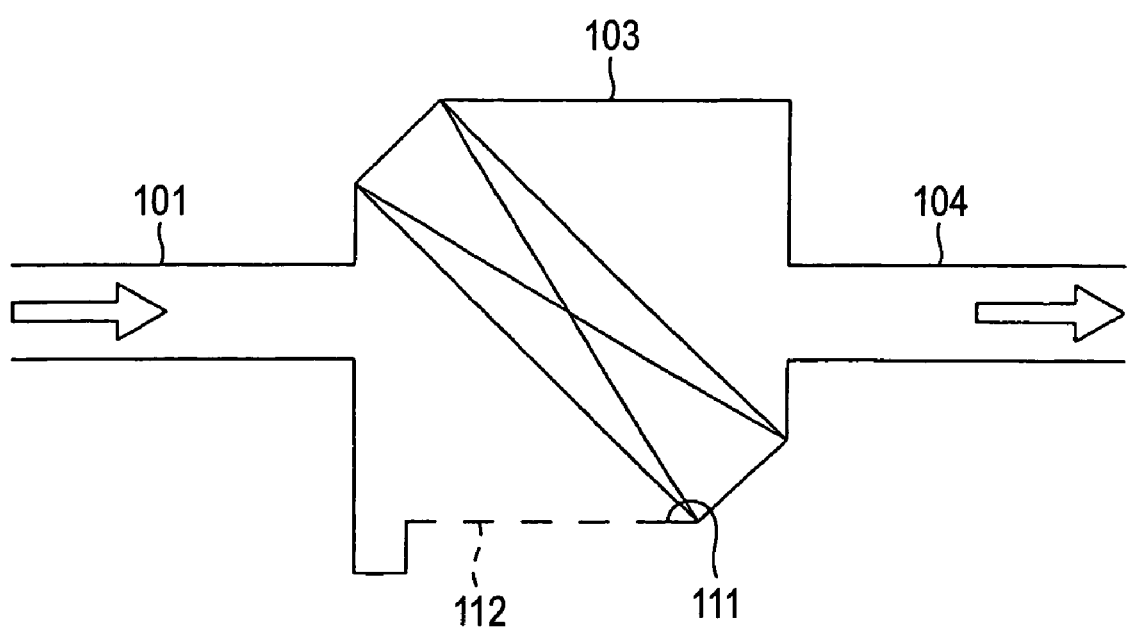
FIG. 8 is a schematic view of an air cleaner of the air intake apparatus in the related art.

FIG. 6 shows the relation among the engine speed, the intake noise and the transmitted noise. In FIG. 6, the abscissa designates the engine speed (rpm). In FIG. 6, the ordinate designates sound pressure (dB). In addition, in FIG. 6, the solid lines (upper) designate intake noise data (thick line of Example and thin line of Comparative Example). In addition, in FIG. 6, the broken lines (lower) designate transmitted noise data (thick line of Example and thin line of Comparative Example).

Incidentally, the intake noise and the transmitted noise are measured as follows. That is, white noise is generated from a speaker disposed on the downstream side of the intake manifold 7, and the intake noise is collected through a microphone disposed on the upstream side of the inlet 20 while the transmitted noise is collected through a microphone disposed on the outside of the valve 81 (on the outside of the air-permeable member 80 in Comparative Example). In addition, the thickness of the air-permeable member 80 is set at 2.5 mm. In addition, the air flow rate of the air-permeable member 80 is set at 16 ($m^3/h \cdot m^2$) at the time of a pressure difference of 98 Pa. Further, the aperture area is set at 58 $cm^2$.

As shown in FIG. 6, in Example, the communicating path 8 is opened by the valve 81 when the engine speed is not higher than 2,500 rpm. On the contrary, in Example, the communicating path 8 is closed by the valve 81 when the engine speed exceeds 2,500 rpm. On the other hand, no valve 81 is disposed in Comparative Example. Therefore, the air-permeable member 80 is always open to the outside regardless of the engine speed.

When the engine speed is not higher than 2,500 rpm, the sound pressure of the intake noise in Example has behavior similar to that in Comparative Example. In addition, the sound pressure of the transmitted noise in Example has behavior similar to that in Comparative Example. From these facts, it is understood that the condition that the communicating path 8 is opened by the valve 81 in Example has a substantially similar effect on the intake noise and the transmitted noise to the condition in Comparative Example (the condition that the air-permeable member 80 is always open to the outside).

On the contrary, when the engine speed exceeds 2,500 rpm, the sound pressure of the transmitted noise in Example becomes conspicuously smaller than the sound pressure of the transmitted noise in Comparative Example. From this fact, it is understood that the sound pressure of the transmitted noise is suppressed by the valve 81 closing the communicating path 8. That is, it is understood that it is effective particularly in suppressing the transmitted noise that the communicating path 8 is controlled to be opened and closed by the valve 81.

According to the invention, it is possible to provide an air intake apparatus in which a high noise suppressing effect can be secured regardless of the existence of occurrence of a lower resonance mode corresponding to the whole length of an intake air passageway.

What is claimed is:

1. An air intake apparatus comprising:
    an air intake duct provided with an inlet through which intake air is introduced;
    an air cleaner disposed on the downstream side of the air intake duct and for filtering the intake air, the air cleaner including a casing;
    an air cleaner hose disposed between the downstream side of the air cleaner and the upstream side of a combustion chamber of an engine and for supplying the filtered intake air to the combustion chamber,
    wherein an intake air passageway, ranging from the inlet to the upstream side of the combustion chamber, is defined by walls of the air intake duct, the air cleaner, and the air cleaner hose;
    an air-permeable member disposed to block a communicating path disposed in a wall of the intake air passageway, wherein the wall surrounds an antinode of a lower resonance mode, the lower resonance mode corresponds to a whole length of the intake air passageway from the inlet to the upstream side of the combustion chamber, and the antinode occurs in the intake air passageway; and
    a valve, disposed in the wall, for opening the communicating path, to allow the inside of the intake air passageway to communicate with the outside thereof at least when the lower resonance mode occurs,
    wherein the valve and the air-permeable member are disposed in the casing.

2. An air intake apparatus according to claim 1, wherein: the air cleaner includes an element for dividing the inside of the casing into a dirty side and a clean side.

3. An air intake apparatus according to claim 1, wherein the valve opens the communicating path at least when an engine speed is not higher than an upper limit value of an engine speed range where the lower resonance mode occurs.

4. An air intake apparatus according to claim 1, further comprising a sound insulation chamber provided on the downstream side of the air-permeable member in the communicating path and for attenuating transmitted noise passing through the air-permeable member.

5. An air intake apparatus according to claim 1, wherein the communicating path is opened and closed with an engine speed being used as an index.

6. An air intake apparatus according to claim 1, wherein the valve closes the communicating path when an engine speed is higher than an upper limit value of an engine speed range where the lower resonance mode occurs.

7. An air intake apparatus comprising:
    an air intake duct provided with an inlet through which intake air is introduced;
    an air cleaner disposed on the downstream side of the air intake duct and for filtering the intake air;
    an air cleaner hose disposed between the downstream side of the air cleaner and the upstream side of a combustion chamber of an engine and for supplying the filtered intake air to the combustion chamber,
    wherein an intake air passageway, ranging from the inlet to the upstream side of the combustion chamber, is defined by the air intake duct, the air cleaner, and the air cleaner hose;
    a communicating path disposed in the air intake passageway, the communicating path further being disposed where there is an antinode of the lower resonance mode inside the air cleaner, the lower resonance mode corresponding to whole length of the intake air passageway from the inlet to the upstream side of the combustion chamber;
    an air-permeable member for blocking the communicating path; and
    a valve for opening and closing the communicating path.

8. An air intake apparatus according to claim 7, wherein the air-permeable member is disposed on an inner side of the communicating path than the valve.

9. An air intake apparatus according to claim 7, wherein the valve is disposed on an inner side of the communicating path than the air-permeable member.

* * * * *